United States Patent [19]

Iwamura et al.

[11] Patent Number: 5,432,888
[45] Date of Patent: Jul. 11, 1995

[54] METHOD FOR ACQUIRING FUZZY KNOWLEDGE

[75] Inventors: Osamu Iwamura, Oyabe; Takashi Hirai, Kanazawa; Koji Echigo, Shinminato; Ueno: Koichi; Naohisa Kometani, both of Yokohama, all of Japan

[73] Assignees: Hitachi, Ltd.; Hitachi Software Engineering Co., Ltd., both of Tokyo, Japan

[21] Appl. No.: 143,744

[22] Filed: Nov. 1, 1993

Related U.S. Application Data

[63] Continuation of Ser. No. 870,326, Apr. 17, 1992, abandoned.

[30] Foreign Application Priority Data

Apr. 19, 1991 [JP] Japan .................................. 3-088114

[51] Int. Cl.⁶ .............................................. G06F 15/00
[52] U.S. Cl. ......................................... 395/12; 395/10; 395/3; 395/900; 395/140
[58] Field of Search .................. 395/76, 140, 155, 3, 395/11, 12, 22, 61, 76, 99, 140, 155, 900, 905, 10–11

[56] References Cited

U.S. PATENT DOCUMENTS

| | | | |
|---|---|---|---|
| 4,984,174 | 1/1991 | Yasunobu et al. | 395/905 |
| 5,008,810 | 4/1991 | Kessel et al. | 395/149 |
| 5,063,376 | 11/1991 | Chang | 340/706 |
| 5,070,534 | 12/1991 | Lascelles et al. | 395/155 |
| 5,107,444 | 4/1992 | Wu | 395/119 |
| 5,127,063 | 6/1992 | Nishiya et al. | 395/900 |
| 5,163,111 | 11/1992 | Baji et al. | 395/22 |
| 5,191,638 | 3/1993 | Wakami et al. | 395/900 |
| 5,193,144 | 3/1993 | Tsutsumi et al. | 395/76 |
| 5,230,040 | 7/1993 | Yamushita | 395/140 |
| 5,239,620 | 8/1993 | Yamakawa et al. | 395/76 |
| 5,261,031 | 11/1993 | Saito | 395/155 |
| 5,261,042 | 11/1993 | Brandt | 395/155 |
| 5,267,348 | 11/1993 | Someya et al. | 395/76 |

OTHER PUBLICATIONS

Leung et al, "A Fuzzy Knowledge-Based System Shell-System Z-1," Proceedings Tencon 87 vol. 2 of 3, pp. 655–659.
Robinson, "MACCAD Takes off," MacUser, Aug. 1990, pp. 114–123.
Wayner, "The Zen of Symbolic Math," Byte, Jun. 1990, pp. 193–196.
Rizzo, "Theorist," MacUser, Jun. 1990, pp. 57–59.
Chiu et al, "Real Time Fuzzy Control; From Linguistic Rules to Implementation on a Chip," Methodologies for Intellectual Systems, 1987, pp. 17–24.

*Primary Examiner*—Allen R. MacDonald
*Assistant Examiner*—Tariq Rafiq-Hafiz
*Attorney, Agent, or Firm*—Antonelli, Terry, Stout & Kraus

[57] ABSTRACT

The definition of membership functions which define a fuzzy set is easily and visually performed by using a pointing device. When a membership function shape model on a function graph display device is pointed to by the pointing device, a parameter value is computed from the pointed-to position, and this value is set in a parameter value memory area in a membership function memory area. The membership functions are defined by performing this operation repeatedly.

6 Claims, 6 Drawing Sheets

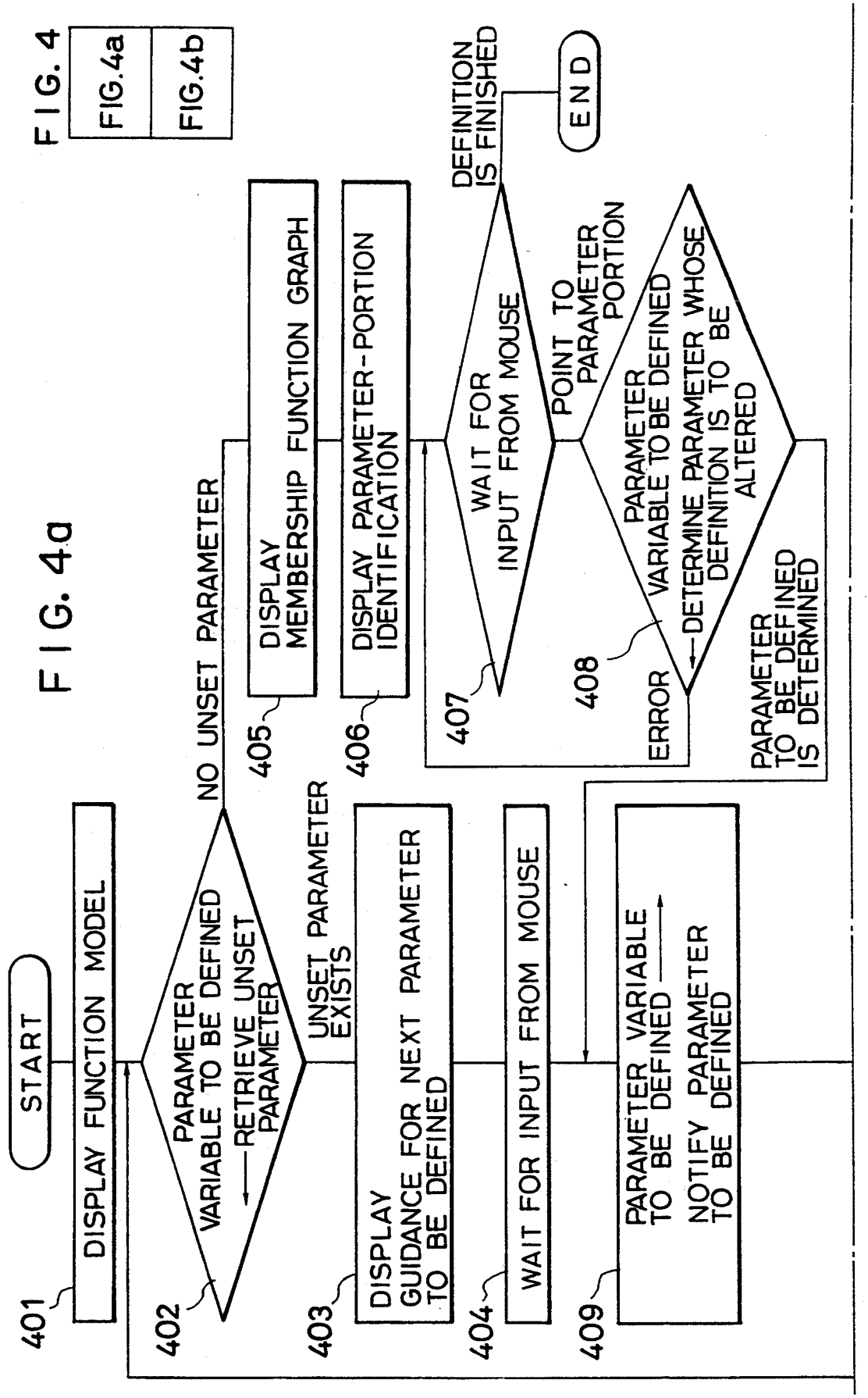

METHOD FOR ACQUIRING FUZZY KNOWLEDGE

This application is a continuation of application Ser. No. 07/870,326, filed Apr. 17, 1992, now abandoned.

BACKGROUND OF THE INVENTION

1. Field of the Invention

The present invention relates to a method of acquiring fuzzy knowledge, which is one technique for expert systems. More particularly, the present invention relates to a technique for efficiently acquiring fuzzy reasoning knowledge by defining membership functions by using a pointing device.

2. Description of the Prior Art

Fuzzy reasoning is applicable as an alternative to sensory-knowledge-based judgment by humans. Such knowledge is expressed as fuzzy knowledge formed of if-then format rules and membership functions used to define a fuzzy set. A support environment for the development of this fuzzy knowledge is described in reference 1 "Fuzzy Expert System Structure Shell", Journal of Information Processing, pp. 948-956, (August, 1989), and reference 2 "Hitachi Creative Workstation 2050 ES/KERNEL/W Operation Guide (2050-3-625-10)" published by Hitachi Software Factory Co., pp. 390-395.

Reference 1 describes a method in which a fuzzy set is defined by giving parameters to membership functions during knowledge editing. Reference 2 describes a method in which a fuzzy set is defined by giving parameters to membership functions from the ten-key keyboad of a workstation as an actual method of editing fuzzy knowledge.

Hitherto, a fuzzy set used in fuzzy reasoning in an expert system has been expressed by membership functions. Concerning the method of defining them, as in the Hitachi Creative Workstation 2050 ES/KERNEL/W, types of membership functions and parameters for membership functions are given in the form of numerical data from the ten-key keyboad thereof.

In the prior art, since parameters for membership functions must be defined by crisp numerical values, trial and error must be carried out repeatedly to define the configuration of the membership functions as desired. For this reason, it is written in reference 1 that graphical functions for efficiently editing membership functions, in addition to symbolic description, are important during the acquisition and editing of fuzzy knowledge.

SUMMARY OF THE INVENTION

The present invention has been accomplished to solve the above-mentioned problems of the prior art.

An object of the present invention is to easily define and alter membership functions, which are a fuzzy set, by using graphical functions.

The above object is achieved by the method described below:

(1) When an item displayed on a display device is pointed to or dragged with a pointing device, the pointed-to position is obtained from the display device, and a parameter value is computed. The result of the computation is set in a parameter value memory area. As described above, membership functions are defined by the use of a pointing device by repeating operations for obtaining pointed-to positions, computing parameter values and setting them in the parameter value memory area.

(2) The graph shape of the defined membership function is displayed on the display device. The parameter portion of the graph shape displayed on the display device is pointed to by the pointing device, the pointed-to position is obtained from the display device, and a parameter value is computed. A defined parameter having a value closest to the computed parameter value is searched for, and a parameter value to be altered is determined Next, when the pointed-to position has been obtained from the display device, a parameter value is computed. The definition of the membership function is altered by setting the computed parameter value in a relevant portion of the parameter value memory area to operate the pointing device.

A reference is made to unset parameters in the parameter value memory area, and parameters to be defined are determined. Next, when an item displayed on the display device for displaying a function graph shape is pointed to and dragged by the pointing device, the final position thereof is obtained from the display on the display device, and it is converted into a parameter value. The value obtained from the conversion is set in an area of the parameter value memory area for storing values of parameters to be defined. All parameter values are set by repeating these operations until unset parameter values no longer exist in the parameter value memory area, making it possible to define the membership function.

Furthermore, when the display of the function graph shape is pointed to by the pointing device, the pointed-to position is obtained from the display device, and it is converted into a parameter value. A defined parameter having a value closest to the value obtained from the conversion is searched for in the parameter value memory area, and this is made a parameter to be defined. Next, the pointed-to position is obtained from the display device when the dragging with the pointing device is finished, and a parameter value is computed. The relevant parameter value memory area is altered by this computed parameter value, with the result that the defined parameter value is altered, making it possible to alter the definition of the existing membership functions.

According to the present invention, membership functions, which are a fuzzy set, can be visually defined by merely pointing to or dragging a parameter position by using the pointing device. In addition, a function graph display device and a display device for monitoring function definition state may be provided as an auxiliary function for defining parameter values. Thus, fuzzy knowledge acquirement with a high degree of operability can be realized.

The aforementioned and other objects, features and advantages of the present invention will become clear when reference is made to the following description of the preferred embodiments of the present invention, together with reference to the accompanying drawings.

BRIEF DESCRIPTION OF THE DRAWINGS

FIGS. 4a and 4b show a flowchart which illustrates the operation of a membership function definition control section.

DETAILED DESCRIPTION OF THE PREFERRED EMBODIMENT

A preferred embodiment of the present invention will be explained below with reference to the accompanying drawings.

Figure 1:
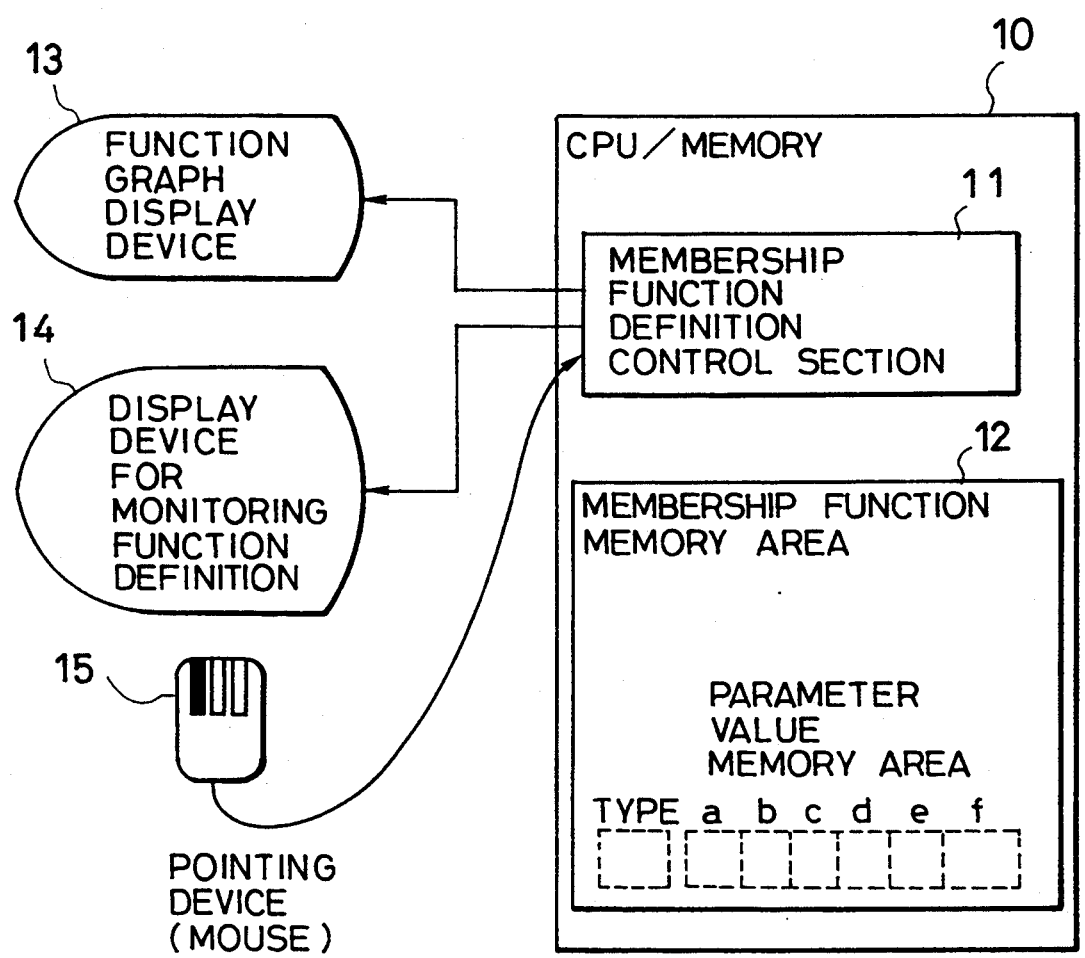
FIG. 1 is a view which illustrates the configuration of of a membership function definition system.

FIG. 1 is a view which illustrates the configuration of a system which defines membership functions according to the present invention. This system comprises a processor 10 formed of a CPU, a memory and the like; a membership function definition control section 11 for controlling a membership function definition system; a membership function memory area 12; a display device 13, formed of a console or the like, for displaying a function graph shape; a display device 14, formed of a console or the like, for monitoring function definition state; and a pointing device 15, such as a mouse.

Figure 2:
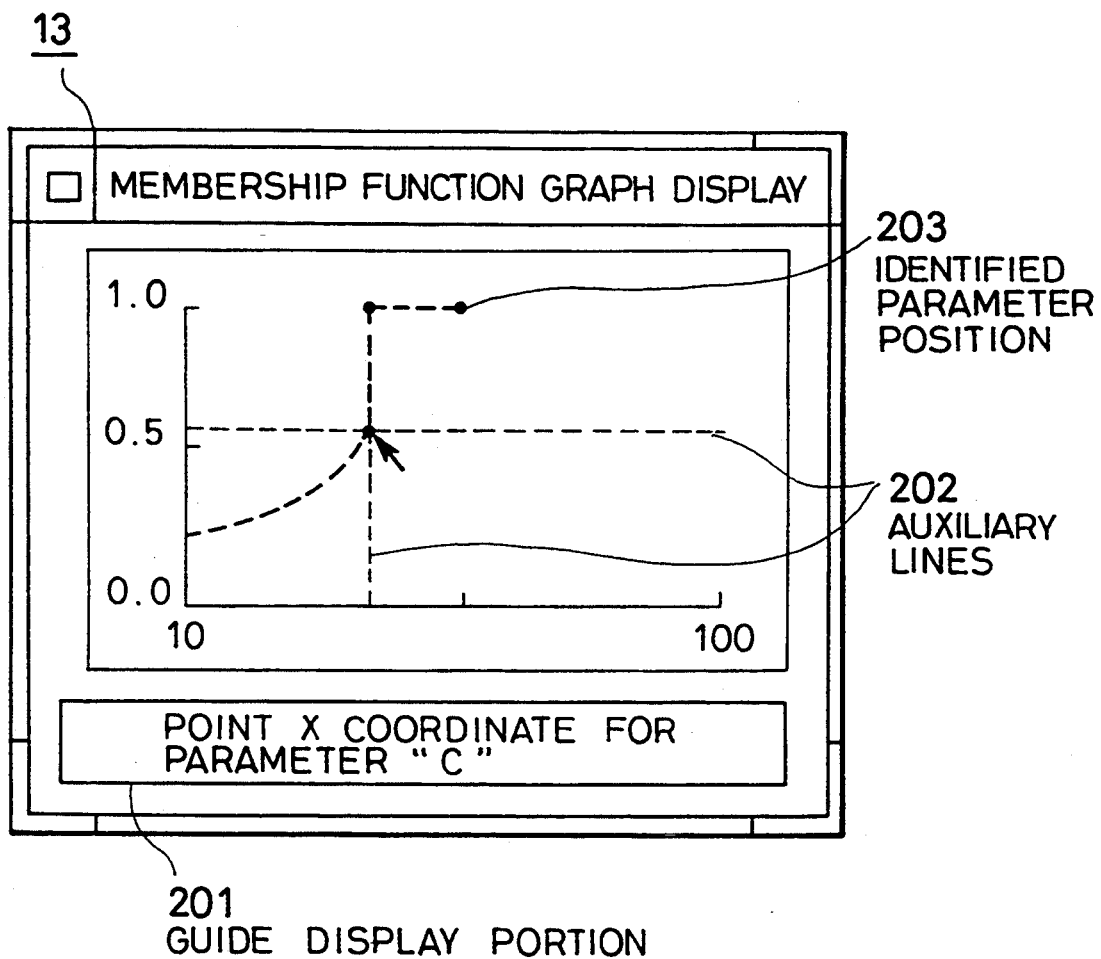
FIG. 2 is a view which illustrates an example of a function display device.

FIG. 2 shows the function graph display device 13. Shown in FIG. 2 are a guide display portion 201 for informing a user of a user definition procedure; auxiliary lines 202 for assistance during parameter definition alteration; and a parameter position identification display 203 for identified parameter position on a graph.

Figure 3:
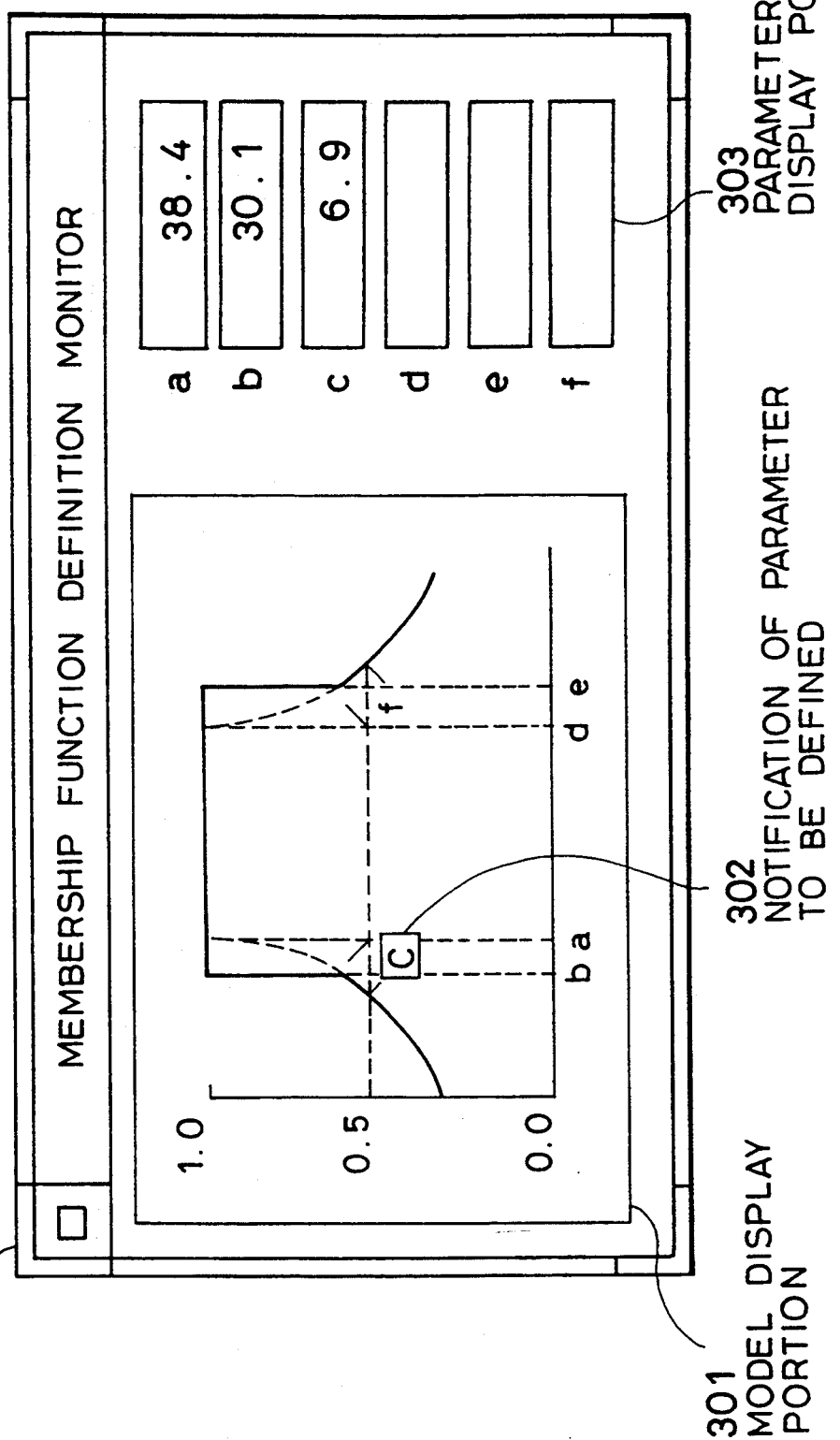
FIG. 3 is a view which illustrates an example of a display device for monitoring function definition.

FIG. 3 shows a display device 14 for monitoring the function definition state. Shown in FIG. 3 are a model display portion 301 for displaying examples of the membership function shapes according to their type; a notification of parameter to be defined 302 for notifying which parameters are to be defined; and a parameter value display portion 303 for instantly displaying in numerical data the definition state from the pointing device.

Figure 4B:
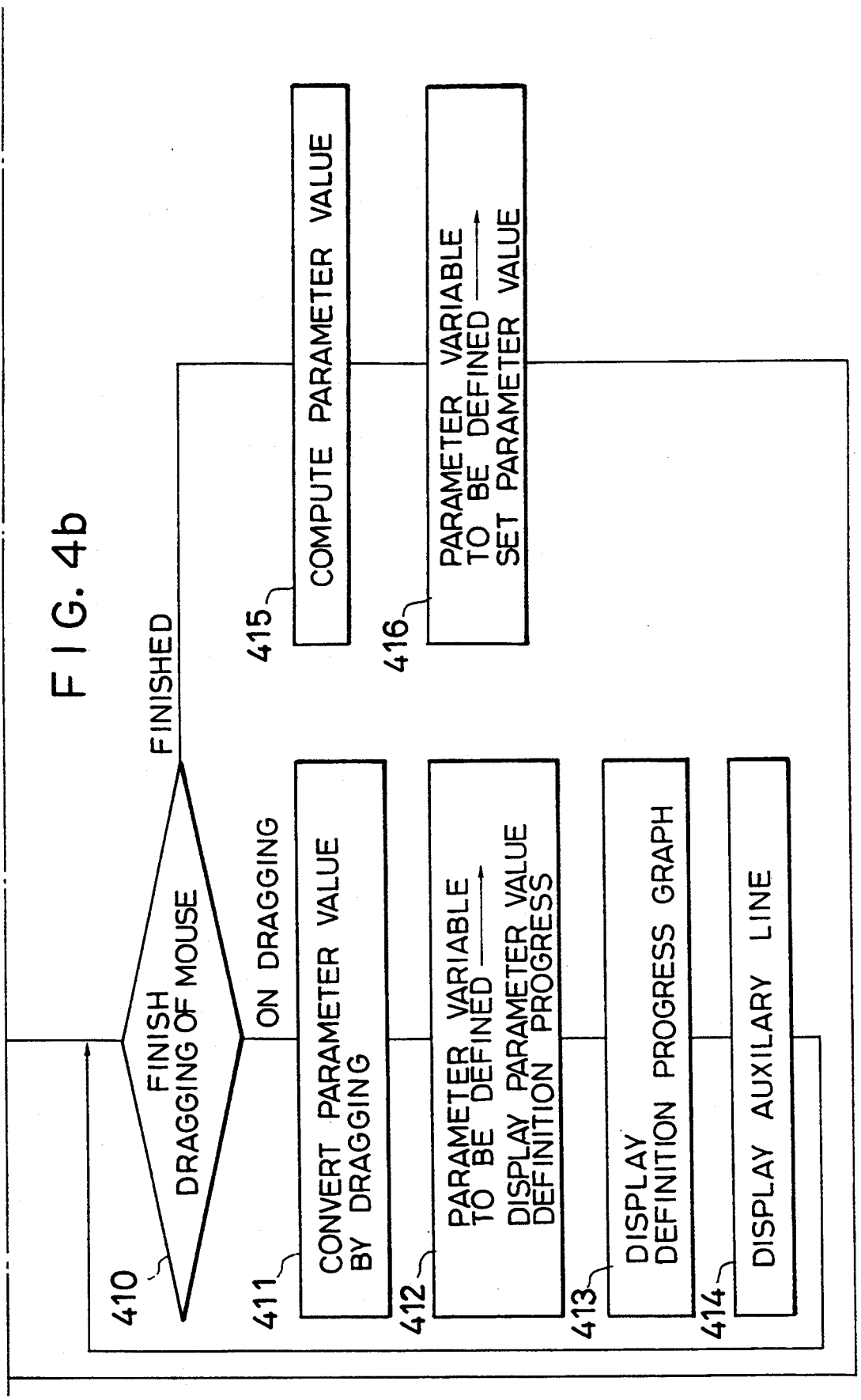

FIG. 4 is a flowchart which illustrates the detailed operation of a membership function definition control section 11.

Figure 5:
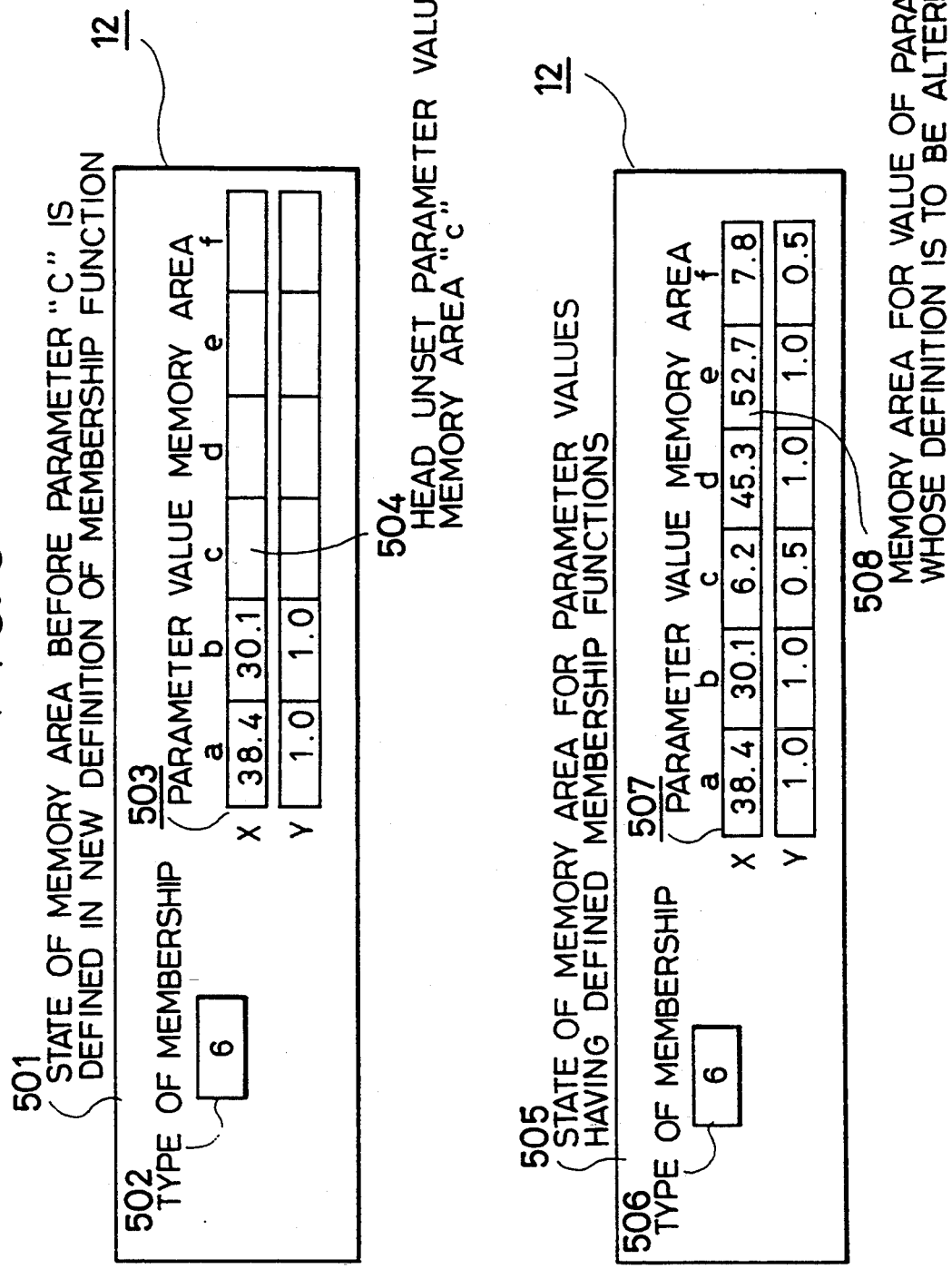
FIG. 5 is a view which illustrates an example of the stored contents of a membership function memory area.

FIG. 5 shows in detail the stored contents of a membership function memory area 12. Shown in FIG. 5 are the state of the membership function memory area 12 before a parameter c is defined during a new definition of a membership function; contents of an area in which the types of the membership functions are stored 502; contents of a parameter value memory area 503; a head unset parameter value memory area "c" 504; a state of an area 12 in which the values of parameters having defined membership functions are stored 505; contents of the parameter value memory area 507; and a memory area "e" 508 for values of parameters to be defined.

A case in which parameters "a" and "b" have already been defined and parameter "c" is defined during the new definition of parameters for a membership function will now be explained as an example with reference to FIGS. 1 to 5. In the flowchart shown in FIG. 4, in a function model display step 401, when the membership function memory area 12 is received in the form of the state 501 before the parameter "c" is defined, a reference is made to membership types 502 in the memory area 12 and the shape model of the membership function, corresponding to the type thereof, is displayed on the model display portion 301 of the display device for monitoring function definition state 14. In an unset parameter retrieval step 402, a parameter value memory area 503 is searched to seek unset parameters, and these unset parameters are stored in variables as parameters to be defined. In this case, since the parameters "a" and "b" have already been set, a head unset parameter value memory area "c" 504 is first searched for an unset parameter. Therefore, the unset parameter becomes "c", and "c" is stored in an area of parameter variable to be defined. Next, when there are unset parameters, a display step of guidance for next parameter to be defined 403 is performed in order to perform a new definition of a membership function. In the display step of guidance for next parameter to be defined 403, to inform a user which parameter must be defined by a message, a message noting a request that the parameter "c" be defined, indicated by the parameter variable to be defined, is displayed on a guide display portion 201 on the function graph display device 13. In a subsequent step for waiting for input from a mouse 404, the operation waits for the position of the parameter to be pointed to by a mouse 15.

In a notification step of parameter to be defined 409, to notify the user which parameter is to be defined, a notification of parameter to be defined 302 corresponding to the parameter "c," indicated by the parameter variable to be defined, is changed to a blinking display in the model display portion 301 on the display device for monitoring the function definition state 14.

Next, a parameter value conversion step by the progress of dragging 411, a parameter value definition progress display step 412, a definition progress graph display step 413 and an auxiliary line display step 414 are performed repeatedly until the dragging of the mouse 15 is finished (step 410). In the parameter value conversion step by the progress of dragging 411, the progress position of the mouse 15 dragging is obtained from the function graph display device 13, and a parameter value is computed. In the parameter value definition progress display step 412, the computed parameter value is displayed on the parameter value display portion 303, corresponding to a display portion of the parameter "c" indicated by the parameter variable to be defined, on the display device 14 for monitoring the function definition state. Next, in the definition progress graph display step 413, the shape of the membership function still in progress is displayed on the function graph display device 13 by using the parameters "a" and "b" which have already been defined from the content of the parameter value memory area 503, and the parameter "c" obtained from the mouse 15. After the graph shape is displayed, in the auxiliary line display step 414, auxiliary lines 202 which are thin broken lines, are displayed vertically and horizontally on the function graph display device 13 with the position pointed to by the mouse 15 as a cross.

Next, when the dragging of the mouse 15 is finished, in a parameter value computation step 415, the position at which the dragging of the mouse 15 is completed is obtained from the function graph display device 13, and a parameter value is computed. In a parameter value setting step 416, the computed parameter value is set in an area 504, corresponding to the parameter "c" indicated by the parameter variable to be defined, in the parameter value memory area 503.

The process returns to the unset parameter retrieval step 402 where steps 411 to 414 for parameters "d", "e", "f", etc. are performed repeatedly until all the unset parameters in the parameter value memory area 503 are set, with the result being that the parameter values of the membership functions are stored one after another in the parameter value memory area 503.

Next, a case in which a parameter "e" of a value of a membership function which has already been defined is altered will be explained as an example with reference to FIGS. 1 to 5.

In the function model display step 401, when the membership function definition area 12 is received in the form of the state 505 in which all parameters have been defined, a reference is made to the membership type 506 in the area 12, and the shape model of the membership function, corresponding to the type thereof, is displayed on the model display portion 301 of the display device for monitoring function definition state 14. In the unset parameter retrieval step 402, a parameter value memory area 507 is searched to seek unset parameters, and these unset parameters are stored in variables as parameters to be defined. In this case, since all the parameters have already been set, there is no unset parameter. A membership function graph display step 405 is performed as a step for altering the definition of existing membership functions. In the membership function graph display step 405, the shape of the membership function is displayed on the function graph display device 13 by using the values of all the parameters which have already been defined from the parameter value memory area 507. Furthermore, in a parameter-portion identification display step 406, a parameter portion on the graph on the function graph display device 13 is displayed in special symbols by using those values. The process waits for input from the mouse pointer (step 407). When an instruction to finish definition from a command or the mouse 15 is accepted, the membership function definition step is stopped. When an instruction to finish definition is not accepted, a step 408 for determining parameters whose value is to be altered is performed. In the step 408 for determining parameters whose definition is to be altered, the position pointed to by the mouse 15 is obtained from the function graph display device 13, and a parameter value is computed. A parameter having a value closest to the computed value is sought, and the parameter is stored in the variable as a parameter to be defined. When there is no existing parameter having a value closest to the computed value, it is considered that an error has occurred, and the process returns to the waiting step for input from the mouse pointer 407. When it is considered that, for example, the allowable range of values of parameters are 3 in the X direction and 0.2 in the Y direction, for example, a parameter value in the X direction of 25 and a parameter value in the Y direction of 0.7 are computed. Since there is no value corresponding to the parameter value memory area 507, an error occurs. Next, if a parameter value in the X direction of 50 and a parameter value in the Y direction of 0.9 are computed, the value 508 of the parameter "e" of the parameter value memory area 507 corresponds to the values, "e" is stored in the variable as a parameter to be defined, and the process proceeds to a notification step parameter to be defined 409.

In the notification step of parameter to be defined 409, a current parameter portion to be defined corresponding to the parameter "e" indicated by the parameter variable to be defined is changed to a blinking display in the model display portion 301 on the display device for monitoring function definition state 14.

Next, the parameter value conversion step by the progress of dragging 411, the parameter value definition progress display step 412, the definition progress graph display step 413 and the auxiliary line display step 414 are performed repeatedly until the dragging of the mouse 15 is finished (step 410). In the parameter value conversion step by the progress of dragging 411, the progress position of the mouse 15 dragging is obtained from the function graph display device 13, and a parameter value is computed. In the parameter value definition progress display step 412, the computed parameter value is displayed on the parameter value display portion 303, corresponding to a display portion of the parameter "e" indicated by the parameter variable to be defined, on the display device 14 for monitoring function definition state. Next, in the definition progress graph display step 413, the shape of the membership function is displayed on the function graph display device 13 by using all the parameters which have already been defined in the parameter value memory area 507, and the parameter "e" obtained from the mouse 15. After the graph shape is displayed, in the auxiliary line display step 414, thin broken lines are displayed vertically and horizontally on the function graph display device 13 with the position pointed to by the mouse 15 as a cross.

Next, when the dragging of the mouse 15 is finished, in the parameter value computation step 415, the position at which the dragging of the mouse 15 is completed is obtained from the function graph display device 13, and a parameter value is computed. In the parameter value setting step 416, the computed parameter value is set in an area 508, corresponding to the parameter "e" indicated by the parameter variable to be defined in the parameter value memory area 507.

The process returns to the unset parameter retrieval step 402. In the waiting step for input from the mouse pointer 407, definitions are altered until an instruction to finish the dragging of the mouse 15 is accepted, with the result being that the parameter values of the membership functions in the parameter value memory area 507 are altered one after another.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included with the spirit and scope of the claims.

What is claimed is:

1. A method of acquiring fuzzy knowledge in order to define and edit a membership function representing a fuzzy set, said method comprising the steps of:
   (a) pointing to a parameter position to be defined from said membership function by applying a pointing device to said membership function displayed on a display device;
   (b) plotting parameter positions pointed to by said pointing device to form a graphic shape of said membership function;
   (c) obtaining a progress position of said pointing device during said plotting of said membership function graphic shape;
   (d) converting said progress position into a parameter value of said membership function;
   (e) storing said parameter value of said membership function;
   (f) plotting an updated graphic shape of said membership function on said display device in accordance with said stored parameter value to form an updated graphic shape of said membership function;

(g) displaying said updated graphic shape of said membership function on said display device;

(h) pointing to an updated parameter position to be defined from said displayed updated membership function by applying said pointing device to said membership function displayed on said display device;

(i) repeating steps (c) through (h) in order to alter a defined parameter value most proximate to said original parameter value to be defined.

2. The method of acquiring fuzzy knowledge according to claim 1, wherein information regarding next parameter to be defined from said membership function is displayed upon said display means.

3. The method of acquiring fuzzy knowledge according to claim 1, whereupon the defining of a parameter value, a shape model of said membership function is accordingly displayed.

4. A method of acquiring fuzzy knowledge in order to define and edit a membership function representing a fuzzy set, comprising the steps of:

pointing to a parameter position of the membership function on a display device by a pointing device and dragging the pointing device so as to form the graphic shape of the membership function;

obtaining a progress position of the pointing device dragged in the pointing and dragging step;

converting the progress position into a parameter value of the membership function to store the parameter value;

displaying the graphic shape of the membership function on the display device by using the pointing device;

pointing parameter position of the displayed membership function by using the pointing device;

determining the closest parameter value stored to the pointed position;

dragging the pointing device so as to form a new graphic shape of the membership function; and repeating the obtaining, converting and displaying associated with the closest parameter value in order to alter the closest parameter value.

5. The method of acquiring fuzzy knowledge according to claim 4, wherein a guidance is displayed before the first pointing step to direct a user to indicate a next parameter of said membership function to be defined.

6. The method of acquiring fuzzy knowledge according to claim 4, wherein when said parameter value currently defined is altered, a shape model of said membership function is displayed.

* * * * *